United States Patent [19]

Sharps, Jr. et al.

[11] Patent Number: 4,673,711

[45] Date of Patent: Jun. 16, 1987

[54] POLYMER BLEND AND METHOD FOR OBTAINING SAME

[75] Inventors: Gordon V. Sharps, Jr., Fairport; Tien-Kuei Su, Pittsford, both of N.Y.

[73] Assignee: Mobil Oil Corporation, New York, N.Y.

[21] Appl. No.: 734,434

[22] Filed: May 16, 1985

[51] Int. Cl.$^4$ .................. C08L 23/10; C08L 25/04
[52] U.S. Cl. .................................. 525/240; 525/197; 525/238; 525/210; 525/222; 525/227; 525/57; 525/239
[58] Field of Search .................... 525/240, 197, 238

[56] References Cited

U.S. PATENT DOCUMENTS

| | | |
|---|---|---|
| 3,018,263 | 1/1962 | Schneider . |
| 3,092,891 | 6/1963 | Baratti . |
| 3,173,163 | 3/1965 | Cramton . |
| 3,652,725 | 3/1972 | Diaz et al. . |
| 3,666,834 | 5/1972 | Bullard . |
| 3,875,260 | 4/1975 | Patel et al. . |
| 4,183,845 | 1/1980 | McGee . |
| 4,237,190 | 12/1980 | McGee . |
| 4,255,531 | 3/1981 | Arbit . |
| 4,365,044 | 12/1982 | Liu . |
| 4,394,235 | 7/1983 | Brandt et al. . |
| 4,464,439 | 8/1984 | Castelein . |
| 4,503,187 | 3/1985 | Gunesin et al. . |

Primary Examiner—Carman J. Seccuro
Attorney, Agent, or Firm—Alexander J. McKillop; Michael G. Gilman; Charles J. Speciale

[57] ABSTRACT

A resin composition is disclosed which comprises a blend of from about 40 to about 95 percent by weight thereof of a first polymeric component and from about 50 to about 5 percent by weight thereof of a second polymeric component, the blend being characterized by an interior region containing a disproportionately higher content of first polymeric component and an exterior region containing a disproportionately higher content of second polymeric component, the first polymeric component being selected from the group consisting of amorphous homopolymer of styrene or lower alkyl substituted styrene and amorphous copolymer of styrene and/or alkyl substituted styrene containing up to about 40 weight percent thereof of at least one other olefinic monomer copolymerized therewith and the second polymeric component being selected from the group consisting of crystalline homopolymer of propylene and crystalline copolymer of propylene containing up to about 30 weight percent thereof of at least one other olefinic monomer copolymerized therewith.

30 Claims, No Drawings

POLYMER BLEND AND METHOD FOR OBTAINING SAME

BACKGROUND OF THE INVENTION

This invention relates to the field of polymer blends.

Blends of polystyrene and polypropylene are known in the art. U.S. Pat. No. 3,018,263 describes blends of crystalline polypropylene with from 5-25% polystyrene. U.S. Pat. No. 3,092,891 discloses the manufacture of monofilaments from mixtures of polypropylene and polystyrene in ratios of from 8:2 to 9.8:0.2. U.S. Pat. No. 3,173,163 describes a longitudinally oriented filament or bristle which is melt extruded from a mixture of from 5-95% of a polyolefin such as polypropylene with the balance made up of an incompatible resin such as polystyrene. U.S. Pat. No. 3,652,725 relates to extrusion coating compositions which are based on triblends of polyethylene, crystalline polypropylene and toluene-alpha-methyl styrene copolymer. U.S. Pat. No. 3,666,834 describes the fabrication of oriented film based on blends of polypropylene and poly(para-tertiary-butyl styrene). In the polymer blend disclosed in U.S. Pat. No. 3,875,260, ethylene-propylene terpolymer particles are contained within a matrix of polystyrene. U.S. Pat. No. 4,183,845 discloses melt-extrudable blends of polypropylene/polystyrene in a ratio of 5:1 to 2:1. The polymer blends of U.S. Pat. No. 4,255,531 are made up of poly(p-methylstyrene) with from 0.1-10% of a poly($C_{2-4}$) olefin such as polypropylene homopolymer or copolymer. U.S. Pat. No. 4,237,190 describes melt extrudable polypropylene/polystyrene blends in the range of 5:1 to 2:1. In U.S. Pat. No. 4,365,044, polymer triblends are prepared with a crystalline polypropylene, a hydrogenated copolymer of vinyl toluene and alpha-methyl styrene and a low density polyethylene. U.S. Pat. No. 4,394,235 provides blends of polypropylene and styrene-terpene copolymers for fabricating packaging films.

SUMMARY OF THE INVENTION

In accordance with the present invention, a resin composition is provided which comprises a blend of from about 40 to about 95 percent by weight thereof of a first polymeric component and from about 60 to about 5 percent by weight thereof of a second polymeric component, the blend being characterized by an interior region containing a disproportionately higher content of first polymeric component and an exterior region containing a disproportionately higher content of second polymeric component, the first polymeric component being selected from the group consisting of amorphous homopolymer of styrene or lower alkyl substituted styrene and amorphous copolymer of styrene and/or alkyl substituted styrene containing up to about 40 weight percent thereof of at least one other olefinic monomer copolymerized therewith and the second polymeric component being selected from the group consisting of crystalline homopolymer of propylene and crystalline copolymer of propylene containing up to about 30 weight percent thereof of at least one other olefinic monomer copolymerized therewith.

Polystyrene products obtained from injection molding, foam extrusion or film forming operations possess suitable rigidity and temperature resistance characteristics for some applications. However, amorphous polystyrene possessing high glass transition temperature (Tg) values are brittle, tend to crack and have limited application for products requiring relatively high temperature resistance.

When polystyrene is combined with polypropylene homopolymer and/or copolymer (collectively, "polypropylene") having an interior region which is comparatively higher in polystyrene content and an exterior region which is comparatively higher in polypropylene content, the foregoing drawbacks associated with polystyrene alone are mitigated or attenuated. In this way, the range of useful applications of polystyrene can be significantly expanded. For example, blends of polystyrene and polypropylene in accordance with the present invention exhibit higher temperature and grease resistance than the same polystyrene in the absence of the polypropylene component. As such, the blends herein are especially useful for manufacturing foam extruded articles where these improved properties are utilized to advantage.

DESCRIPTION OF THE PREFERRED EMBODIMENTS

The first polymeric component of the resin composition of this invention is selected to be an amorphous homopolymer of styrene or an alkyl substituted styrene such as a methylstyrene, preferably, paramethylstyrene, or a butylstyrene, preferably a tertiarybutylstyrene such as paratertiarybutylstyrene, or a copolymer of styrene and/or alkyl substituted styrene such as any of those just named with up to 40 weight percent, and preferably no more than about 15 weight percent, of at least one non-styrenic olefinic monomer copolymerizable therewith, for example, acrylic acid, methacrylic acid, acrylonitrile, methacrylonitrile, ethylene, propylene, 1,4-butadiene, vinyl acetate, vinyl toluene, vinyl ketone, vinyl ether, various terpenes and the like. Illustrative of such copolymers are styrene-acrylonitrile copolymers, vinyl toluene-alphamethylstyrene copolymer and styrene-terpene copolymer.

Amorphous styrene homopolymers having average molecular weights greater than about 200,000, preferably in the range of from about 250,000 to about 325,000, and having low initial monomer levels, are preferred for use in the resin compositions of this invention. Examples of the preferred polystyrenes are Dow 666 and Dow 685 of the Dow Chemical Co., Midland, Mich.

The second polymeric component of the resin composition of this invention is selected to be a crystalline, i.e., isotactic, homopolymer of propylene such as any of those described in U.S. Pat. Nos. 2,882,263, 2,874,153, and 2,913,442, or a crystalline copolymer of propylene containing up to about 30 weight percent, and preferably no more than about 10 weight percent, of one ore more other olefinic monomers copolymerizable therewith, for example, certain of the propylene-alphamonoolefin copolymers described in U.S. Pat. Nos. 3,418,396 and 3,529,037.

Crystalline polypropylenes having average molecular weights of from about 100,000 to about 150,000 are especially preferred and are available from numerous sources.

The resin blends will contain from about 40 to about 95 weight percent, and preferably from about 50 to about 90 weight percent, of the first polymeric component with from about 60 to about 5 weight percent, and preferably from 50 to about 10 weight percent, of the second polymeric component. In addition to the foregoing first and second polymeric components, the resin compositions herein can contain minor amounts, for example, up to 20 weight percent of the total of said components and preferably not more than about 10 weight percent thereof, of one or a mixture of other polymeric components compatible with the first and second polymeric components. Illustrative of such other polymers are polyvinylacetate, ethylene-vinyl acetate copolymer, ethylene-vinyl acetate-vinyl alcohol terpolymer, acrylic resins, polyethylene, polybutylene, and so forth.

The resin composition of this invention can include known and conventional additives such as antioxidants, stabilizers for inhibiting degradation by heat, ultraviolet light and weathering, pigments, colorants, reinforcements agents, fillers, etc., in the usual amounts. The resin compositions can be formed into sheets, films or foamed sheets and can be thermoformed to produce shaped articles.

The components of the resin composition herein can be melt blended in known and conventional extrusion apparatus. However, the melt extrusion conditions are critical to obtaining the disproportionate blends of this invention. Thus, it is necessary to extrusion blend the first and second polymeric components at a shear stress level of from about $5.0 \times 10^5$ to about $1.0 \times 10^7$ dynes/cm$^2$, preferably from about $0.75 \times 10^6$ to about $5.0 \times 10^6$ dynes/cm$^2$ and most preferably from about $1.0 \times 10^6$ to about $2.0 \times 10^6$ dynes/cm$^2$.

In the examples which follow, blending was achieved employing an Instron capillary rheometer (Model 3211) having a capillary diameter of 0.05 inches and length of 3 inches and a die having a 90° entry angle.

EXAMPLE 1

90 parts by weight of amorphous polystyrene (Dow 685) and 10 parts by weight of crystalline polypropylene (Arco W472) were blended in the aforementioned Instron capillary rheometer (Model 3211) at a shear stress level of $1.29 \times 10^6$ dynes/cm$^2$ and thermal analysis was made of the extrudate, a blend of these two polymers, employing a Differential Scanning Calorimeter (DSC-2 of Perkin Elmer Corporation, Norwalk, Conn.). Comparison of the heating thermogram obtained for the exterior region of the extrudate with that obtained for the interior region of the extrudate showed that most of the polypropylene was present in the exterior region. The thermograms thus established that a blend was obtained in accordance with the present invention, namely, one in which the content of polystyrene (the first polymeric component) is disproportionately high in the interior region of the blend while the content of polypropylene (the second polymeric component) is disproportionately high in the exterior region of the blend.

EXAMPLE 2

Example 1 was substantially repeated except that 80 parts of the polystyrene were blended with 20 parts of the polypropylene and extrusion was carried out at a shear stress level of $1.19 \times 10^6$ dynes/cm$^2$. Comparison of the thermograms obtained for the resulting blend again showed a preferential concentration of polypropylene in the exterior region of the blend and a disproportionately higher concentration of polystyrene in the interior region of the blend.

EXAMPLE 3

Example 1 was again substantially repeated but with equal parts of polystyrene and polypropylene and with extrusion being carried out at a shear stress level of $0.99 \times 10^6$ dynes/cm$^2$. Again, thermogram measurement of the exterior and interior regions of the blend showed a disproportionate distribution of resins as before.

What is claimed is:

1. A resin extrudate which comprises the product resulting from extrusion blending from about 40 to about 95 percent by weight thereof of a first polymeric component and from about 60 to about 5 percent by weight thereof of a second polymeric component, at a shear stress level of from about $5.0 \times 10^5$ to about $1.0 \times 10^7$ dynes/cm$^2$, the blend being characterized by an interior region containing a disproportionately higher content of first polymeric component and an exterior region containing a disproportionately higher content of second polymeric component, the first polymeric component being selected from the group consisting of amorphous homopolymer of styrene or lower alkyl substituted styrene and amorpyhous copolymer of styrene and/or alkyl substituted styrene containing up to about 40 weight percent thereof of at least one other olefinic monomer copolymerized therewith and the second polymeric component being selected from the group consisting of crystalline homopolymer of propylene and crystalline copolymer of propylene containing up to about 30 weight percent thereof of at least one other olefinic monomer copolymerized therewith.

2. The resin composition of claim 1 containing from about 50 to about 90 weight percent of first polymeric component.

3. The resin composition of claim 2 containing from about 50 to about 10 weight percent of second polymeric component.

4. The resin composition of claim 1 containing a homopolymer of styrene.

5. The resin composition of claim 4 wherein the homopolymer possesses an average molecular weight greater than about 200,000.

6. The resin composition of claim 4 wherein the homopolymer possesses an average molecular weight in the range of from about 250,000 to about 325,000.

7. The resin composition of claim 1 containing a homopolymer of an alkyl substituted styrene.

8. The resin composition of claim 7 wherein the alkyl substituted styrene is a methylstyrene.

9. The resin composition of claim 7 wherein the alkyl substituted styrene is a butylstyrene.

10. The resin composition of claim 8 wherein the methylstyrene is paramethylstyrene.

11. The resin composition of claim 9 wherein the butylstyrene is paratertiarybutylstyrene.

12. The resin composition of claim 1 containing a copolymer of styrene and/or alkyl substituted styrene with no more than about 15 weight percent of at least one non-styrenic olefinic monomer copolymerizable therewith.

13. The resin composition of claim 12 wherein the copolymer is a styrene-acrylonitrile copolymer, vinyl toluene-alphamethylstyrene copolymer or styrene-terpene copolymer.

14. The resin composition of claim 1 containing a homopolymer of propylene.

15. The resin composition of claim 14 wherein the homopolymer possesses an average molecular weight in the range of from about 100,000 to about 150,000.

16. The resin composition of claim 1 containing a copolymer of polypropylene with no more than about 10 weight percent of at least one olefinic monomer copolymerizable therewith.

17. The resin composition of claim 1 further containing up to about 20 weight percent thereof of one or more other polymeric components which are compatible with the first and second polymeric components.

18. The resin composition of claim 1 further containing up to about 10 weight percent of one or more other polymeric components which are compatible with the first and second polymeric components.

19. The resin composition of claim 17 wherein the other polymeric component is polyvinylchloride, polyvinylidenechloride, polyvinylacetate, ethylene-vinyl acetate copolymer, ethylene-vinyl acetate-vinyl alcohol terpolymer, acrylic resin, polyethylene or polybutylene or mixture of any of the foregoing.

20. The resin composition of claim 1 consisting essentially of a blend of from about 50 to about 90 percent by weight thereof of a first polymeric component which is selected to be an amorphous homopolymer of styrene and from about 50 to about 10 percent by weight thereof of a second polymeric component which is selected to be a crystalline homopolymer of propylene.

21. A method of obtaining the resin composition of claim 1 which comprises extrusion blending the polymeric components at a shear stress level of from about $5.0 \times 10^5$ to about $1.0 \times 10^7$ dynes/cm$^2$.

22. The method of claim 21 wherein extrusion blending is carried out at a shear stress level of from about $0.75 \times 10^6$ to about $5.0 \times 10^6$ dynes/cm$^2$.

23. The method of claim 21 wherein extrusion blending is carried out at a shear stress level of from about $1.0 \times 10^6$ to about $2.0 \times 10^6$ dynes/cm$^2$.

24. A method of obtaining the resin composition of claim 20 which comprises extrusion blending the polymer components at a shear stress level of from about $5.0 \times 10^5$ to about $1.0 \times 10^7$ dynes/cm$^2$.

25. The method of claim 24 wherein extrusion blending is carried out at a shear stress level of from about $0.75 \times 10^6$ to about $5.0 \times 10^6$ dynes/cm$^2$.

26. The method of claim 24 wherein extrusion blending is carried out at a shear stress level of from about $1.0 \times 10^6$ to about $2.0 \times 10^6$ dynes/cm$^2$.

27. The resin extrudate of claim 1 wherein the extrusion blending of the polymeric components is carried out at a shear stress level of from about $0.75 \times 10^6$ to about $5.0 \times 10^6$ dynes/cm$^2$.

28. The resin extrudate of claim 1 wherein the extrusion blending of the polymeric components is carried out at a shear stress level of from about $1.0 \times 10^6$ to about $2.0 \times 10^6$ dynes/cm$^2$.

29. The resin extrudate of claim 20 wherein the extrusion blending of the polymeric components is carried out at a shear stress level of from about $0.75 \times 10^6$ to about $5.0 \times 10^6$ dynes/cm$^2$.

30. The resin extrudate of claim 20 wherein the extrusion blending of the polymeric components is carried out at a shear stress level of from about $1.0 \times 10^6$ to about $2.0 \times 10^6$ dynes/cm$^2$.

* * * * *